United States Patent
McArdle et al.

[19]

[11] Patent Number: 6,050,778
[45] Date of Patent: Apr. 18, 2000

[54] SEMI-ARTICULATED ROTOR SYSTEM

[75] Inventors: Francis H. McArdle, Norristown, Pa.;
Thomas W. Griffith, Sr., The Villages, Fla.; George H. Thompson, Gloucester, N.J.; John H. Peck, Boothwyn, Pa.; Helene G. McArdle, Norristown, Pa., executor of said Francis H. McArdle, deceased

[73] Assignee: The Boeing Company, Seattle, Wash.

[21] Appl. No.: 09/160,449

[22] Filed: Sep. 24, 1998

[51] Int. Cl.$^7$ ................................................. B64C 27/51
[52] U.S. Cl. .......................... 416/107; 416/104; 416/106; 416/134 A; 416/140; 416/141; 416/230; 416/244 R; 416/244 D; 29/889.21; 29/450
[58] Field of Search ..................................... 416/104, 106, 416/107, 134 A, 140, 141, 230, 244 D, 244 R; 29/889.21, 888.025, 450

[56] References Cited

U.S. PATENT DOCUMENTS 5,156,527  10/1992  Pancotti ............................. 416/244 R
5,267,833  12/1993  Mouille ................................... 416/107
5,542,818   8/1996  Monvaillier et al. ............... 416/134 A

*Primary Examiner*—Edward K. Look
*Assistant Examiner*—Liam McDowell
*Attorney, Agent, or Firm*—Christensen O'Connor Johnson & Kindness PLLC

[57] ABSTRACT

A semi-articulated stiff-in-plane (SASTIP) rotor hub is provided. The hub includes a cylindrical composite shell (12). A plurality of flexure mount assemblies (16) are positioned around the periphery of the hub shell. Each flexure mount assembly includes both an upper and a lower flexure (64), (66). The outboard ends of the upper and lower flexures attach to an outboard bearing support (34). The inboard end of each flexure is maintained within first and second clamp plates (76), (78) that are mounted within hub flexure openings (38), (40). The flexure clamp plates (76), (78) additionally attach circumferentially to annular CF rings (24), (26), (28), (30) positioned within the hub shell. A blade shaft (14) extends through the outboard bearing (72) and connects to a spindle. The spindle is supported by a spherical bearing that is mounted within the hub shell (12) at a circular spindle hole. The structural characteristics of each of the flexures are tailored to achieve desired differential spring rates to control both flapping and lead-lag displacements of the respective blades, as well as natural frequencies of the rotor.

21 Claims, 4 Drawing Sheets

SEMI-ARTICULATED ROTOR SYSTEM

FIELD OF THE INVENTION

The present invention relates to prop rotor systems for tilt rotor aircraft, helicopters, and the like.

BACKGROUND OF THE INVENTION

As used herein, the term "prop rotor" refers to a system that rotates and provides lifting and control forces. The term "rotor blade" refers to the aerodynamic, structural, and lifting portion of a rotor system that directly connects to a central hub or drive. Rotor blades include an elongated airfoil-shaped wing, a blade shaft, and in some embodiments, a blade spindle. Rotating blades provide lift and propulsive force for helicopters and tilt rotor aircraft during all or some portion of their flight regime. The number of blocks directly affects the vibratory frequency of the rotor system and, together with the rotational speed, also significantly influences the acoustical signature.

The operational forces experienced by a prop rotor include aerodynamic, inertial, and centrifugal forces. These forces produce complex and highly stressed loadings on the rotor blades as well as the central hub to which the blades are attached. To control the craft, mechanisms are commonly provided to rotate the blades about a blade longitudinal axis during aerodynamic loading in order to control the pitch of the blades. To accept system structural stresses through the entire spectrum of control inputs, it is important that all system components be designed to the most optimum dynamic properties, including blade natural frequencies and in-plane (lead-lag) and out-of-plane (flapping) deflections and frequencies.

Known articulated rotor hub designs incorporate various mechanical flapping hinges and lead-lag hinges in order to reduce structural stresses while allowing for aerodynamic control of the rotor systems. Although lead-lag and flapping hinges help reduce stresses, they also increase the complexity of the overall structural design and, in the case of lag hinges, can contribute to degradation of the aerodynamic stability at high speeds. In response to these problems, designers have created rotor system designs that incorporate the use of flexible beams or other flexible structures directly into the design of the hub, in place of the mechanically complex lead-lag or flapping hinges, and have also created rigid rotor systems, having no flexible hinges.

Two such flexible beam designs are described in U.S. Pat. Nos. 5,096,380 and 5,372,479 both issued to Byrnes. These designs both eliminate the need for lead-lag hinges and flapping hinges by connecting a rotor blade to the hub using a flexible composite beam. The flexible composite beam directly connects the rotor blade to the rotor assembly while allowing both inboard flapping flexure and outboard lead-lag and torsion flexure. The thickness and dynamic characteristics of the flex beam are designed to allow a suitable degree of lead-lag and flapping flexure. Although the use of a single flexure as set forth in the Byrnes patents results in decreased complexity, it can also result in a potential decrease in rotor and blade stability at high speeds.

Thus, a need exists for a rotor system design that reduces complexity while maintaining high speed rotor stability. The ideal design would further be of minimum weight. The present invention is directed towards addressing this need.

SUMMARY OF THE INVENTION

In accordance with aspects of the present invention, a semi-articulated, stiff-in-plane (SASTIP) prop rotor system for use with radially-extending blade shafts each having an inboard end is provided. The rotor system includes a hub assembly having a hub shell. The hub shell includes a number of flexure openings, a number of spindle openings, a number of annular rings disposed within the shell and connected thereto, and a number of inboard spherical bearings. One inboard bearing is located within each spindle opening. The inboard spherical bearing is adapted to support the blade shaft inboard end.

The rotor system further includes a number of flexure mount assemblies. Each flexure mount assembly includes at least two flexures having an inboard end and an outboard end. Each flexure mount assembly further includes an outboard spherical bearing connected to the flexure outboard end. The purpose of this bearing is to isolate the flexures from blade moments. The outboard spherical bearing is adapted to support the blade shaft. Each flexure inboard end is positioned through a hub shell flexure opening and fastened to two annular rings. During rotary motion of the rotor system, vertical and in-plane blade loads and moments are transmitted to the hub shell through the flexures, and vertical and in-plane loads and moments as well as centrifugal blade loads are transmitted to the hub shell through the inboard spherical bearing, the flexures, and the annular rings.

In accordance with other aspects of this invention, the flexure assembly further includes a pair of clamp plates connected to the hub shell at locations above and below each flexure opening to provide a vertical moment reaction at the hub shell. In one embodiment, the flexures include attachment portions and the first and second clamp plates include mating recesses that engage the attachment ridges. The clamp plates are circumferentially attached about the annular rings. The hub flexure openings preferably include upper and lower edge surfaces and the pair of camp plates is positioned within the hub shell flexure openings at these surfaces. In one embodiment mechanism fasteners are provided at each clamp plate.

In accordance with further aspects of this invention, the connection of the flexure to the outboard spherical bearing includes fastening the flexure outboard end to an outboard bearing support and rotatably connecting the support to the outboard spherical bearing. In one embodiment, the connection of the annular rings to the hub shell includes attaching a number of corner fittings to the interior of the hub shell and connecting the rings and the flexures to the corner fittings. Further, the annular ring preferably include a non-segmented ring and a segmented ring, both rings being attached to the corner fittings in stacked relation.

In one embodiment, the annular rings are positioned laterally within the hub shell one on top of the other, the pair of upper clamp plates are attached circumferentially about the two highest rings, and the pair of lower clamp plates are attached circumferentially about the two lowest rings. The upper flexure is positioned through a hub shell upper flexure opening, and the lower flexure being positioned through a hub shell lower flexure opening. Both flexures are clamped therein by the corresponding pair of clamp plates and fastened between the corresponding two annular rings.

In accordance with still other aspects of this invention, a method of connecting a number of radially ending prop rotor blade shafts to a central hub is provided. Each shaft has an inboard end. The method includes providing a hub including a hub shell having a number of flexure openings, a number of spindle openings, a number of annular rings disposed within the shell and connected thereto, and a number of inboard spherical bearings, one being located within each spindle opening. The method also includes providing a number of flexure mount assemblies each including at least two flexures having an inboard end and an outboard end. An outboard spherical bearing is connected to each flexure outboard end. The flexure inboard end is positioned through a hub shell flexure opening and fastened to at least one annular ring. Each blade shaft inboard end is positioned in an inboard spherical bearing and extended through an outboard spherical bearing. During rotary motion of the rotor system, the flapping, lead/lag, and centrifugal blade loads are transmitted to the hub shell through the inboard and outboard spherical bearings, the flexures, and the annular rings.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
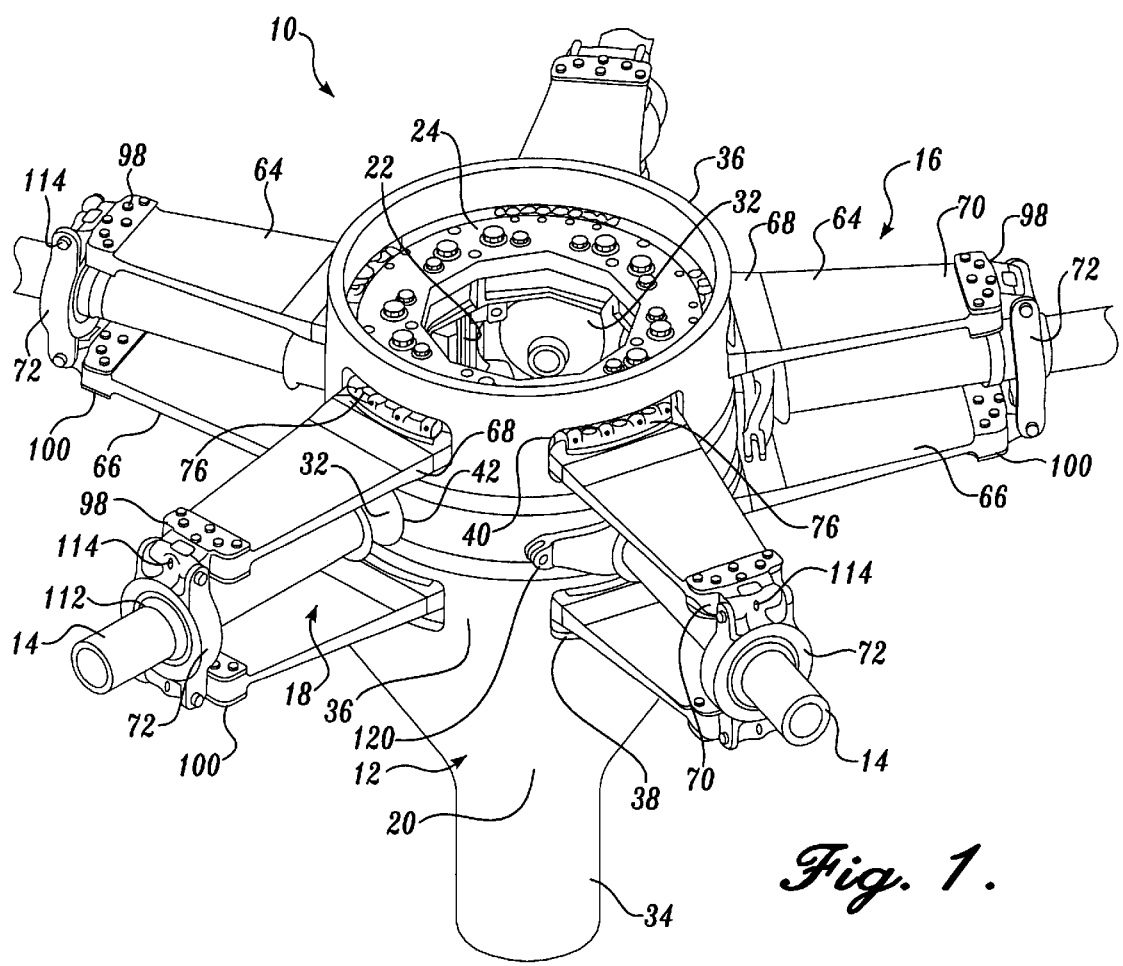
FIG. 1 is a perspective view of a rotor hub formed in accordance with the present invention.

In general, and referring to FIG. 1, a semi-articulated, stiff-in-plane (SASTIP) prop rotor system 10 formed in accordance with the present invention includes a hub assembly 12 from which a multiplicity of blades (blade shafts 14 are shown in FIG. 1) extend radially outward. The blades may be rotated about their longitudinal axis to provide full blade pitch control. The blades are mounted to the hub assembly 12 using flexure mount assemblies 16 that permit controlled spring rates in both out-of-plane and in-plane directions. Out-of-plane movement is generally referred to as "flapping". In-plane movement is generally referred to as "lead/lag". Thus, a prop rotor system formed in accordance with the present invention can be tuned to provide desired frequency placement and adequate articulation for all helicopter control requirements, as well as to minimize loads transmitted to the aircraft.

The rotor system may be configured for use with various aircraft designs, including tilt rotor aircraft, single rotor helicopters, and tandem rotor helicopters. One embodiment of a present invention prop rotor system 10 is illustrated in FIGS. 1–5. Referring to FIG. 1, the hub assembly 12 is centrally located about a drive shaft (not shown.) The flexure mount assemblies 16 connect the blades to the hub assembly 12 and orient the blades radially outward therefrom. The flexure mount assemblies 16 are used to support and limit the movement of the blades. A number of inboard blade shaft assemblies 18 (shown in FIG. 1) connect the blades to their respective flexure mount assemblies 16 and to the hub assembly 12. The prop rotor system of FIGS. 1–5 is for use with five blades and is preferably implemented having stiff in-plane attributes and controlled amounts of flapping. The present invention may be practiced with other numbers of blades. Further, by adjusting the out-of-plane and in-plane spring rates as described below, a soft in-plane version of the rotor system may be achieved. This would require the addition of lag damping to control rotor system dynamic stability.

Figure 2:
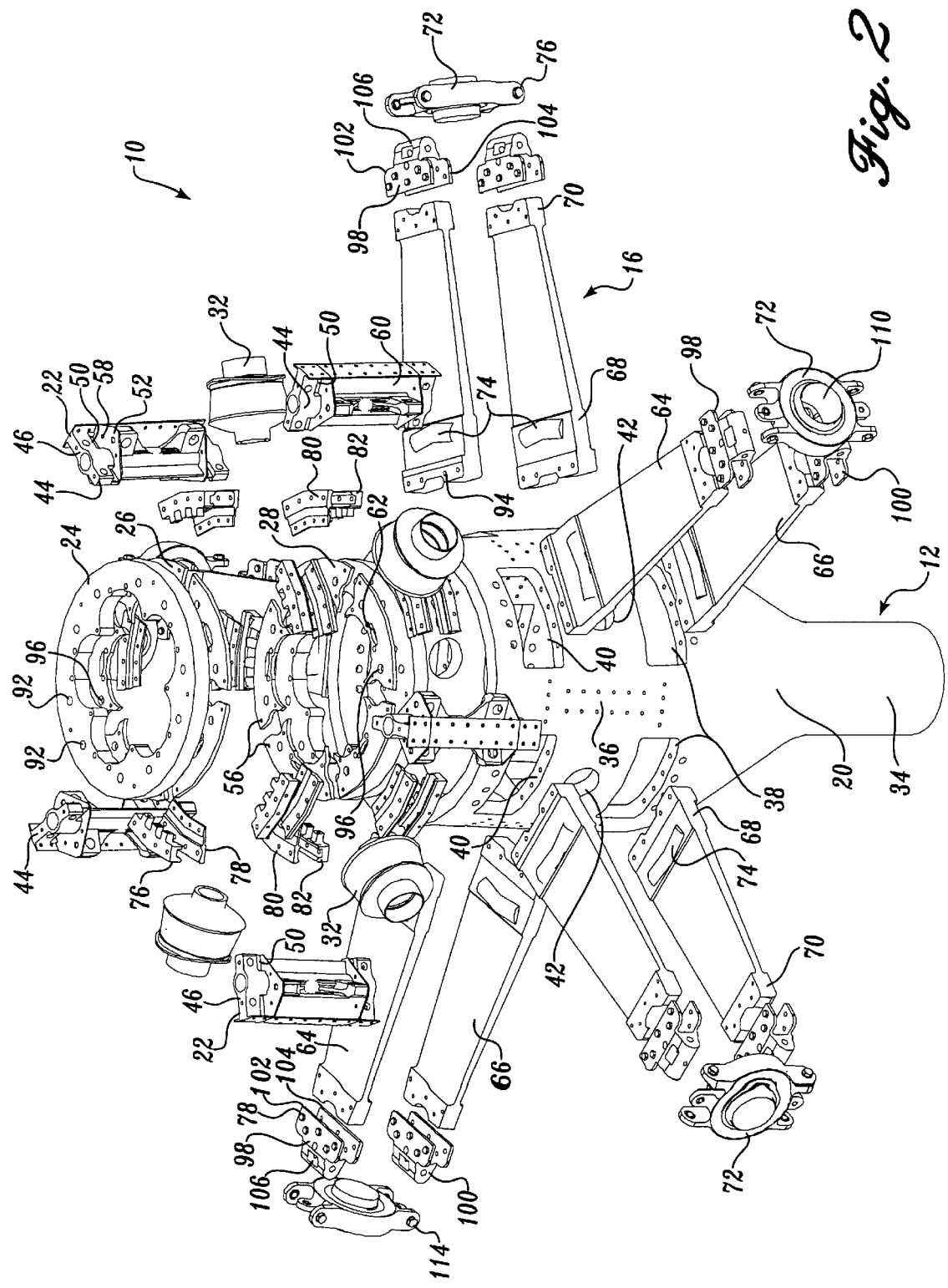
FIG. 2 is an exploded view of the hub of FIG. 1.

Referring to FIG. 2, the hub assembly includes a cylindrical hub shell 20; five corner fittings 22; upper and lower centrifugal force rings 24, 30 (also referred to herein as "CF rings"); upper and lower segmented centrifugal force rings 26, 28; and five inboard spherical bearings 32. The CF rings accept centrifugal forces from an blades. The inboard spherical bearings 32 further transmit lead/lag and flapping blade forces directly into the hub shell 20.

Referring back to FIG. 1, the hub shell 20 includes an upright tubular lower portion 34 configured to connect to a conventional drive shaft (not shown) extending from a rotor transmission powered by the vehicle engine. In moving upward from the lower portion 34, the diameter of the hub shell increases to establish an upper section 36 having constant diameter. The larger diameter of the hub shell upper portion 36 provides structure upon which to mount the inboard spherical bearings 32. Acting through the bearings 32, the blade centrifugal forces are transmitted to the hub shell. In preferred embodiments, the hub shell 20 is fabricated from composite materials using known automated fabrication methods. For example the hub can be fabricated using either fiber tow placement or filament winding to form a monolithic structure or a structure incorporating a central honeycomb or other type of structural core to add structural rigidity.

The upper section 36 includes a plurality of lower openings 38, upper openings 40, and spindle holes 42 that are positioned around the circumference of the hub shell 20 and extend through the thickness of the shell. The number of lower openings 38, upper openings 40 and spindle holes 42 is determined by the number of rotor blades to be mounted on the hub assembly. In the embodiment illustrated, five blades are used. Therefore, five lower openings 38, five upper openings 40, and five spindle holes 42 are provided. The lower and upper openings 38 and 40 are rectangularly shaped. The spindle holes 42 are circularly shaped. At each blade location, there is one upper opening 40, one lower opening 38 located vertically below the upper opening, and one spindle hole 42 located between the lower and upper openings 38, 40.

Figure 3:
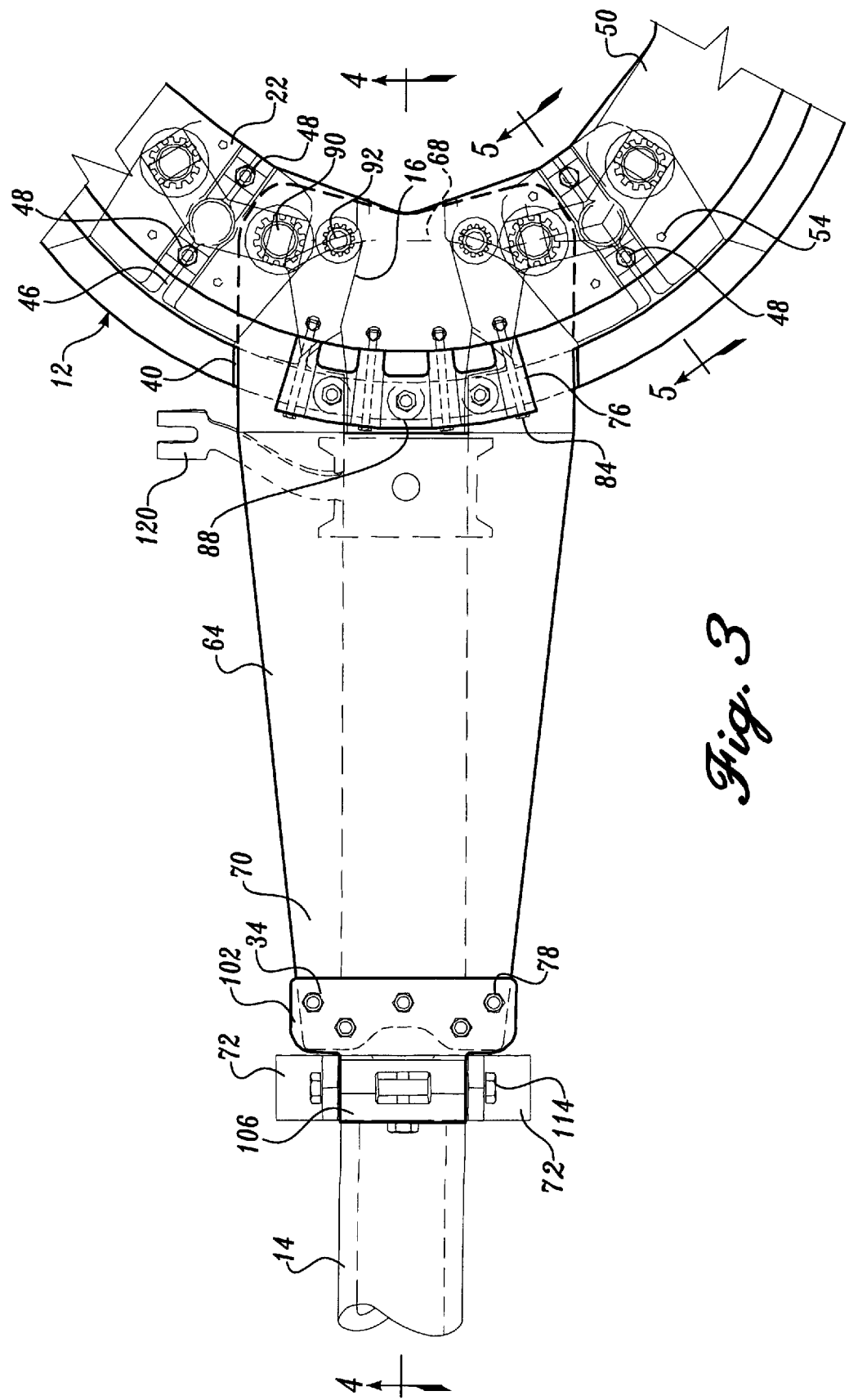
FIG. 3 is a top-down partial plan view of the hub of FIG. 1.

Referring to FIGS. 2 and 3, the corner fittings 22 attach to the inside surface of the hub shell upper section 36 and are provided for use in connecting the CF rings 24, 30 and segmented CF rings 26, 28 to the hub shell 20. The fittings 22 also act as upright ribs to maintain the distance between the CF rings and, hence, between the flexures as described below. Each corner fitting 22 includes various attachment flanges positioned about an upright center rib 44.

Referring to FIG. 1, the CF rings are positioned within the hub shell upper section 36 with the order of placement from bottom-to-top being: lower CF ring 30, lower segmented CF ring 28, upper segmented CF ring 26, and upper CF ring 24. As best illustrated in FIG. 2, the upper and lower CF rings 24, 30 are continuous one-piece annular rings. The upper and lower segmented CF rings 26, 28 are also annularly arranged, though segmented into five planar arcuate pieces. The CF rings are structurally designed to distribute the flapping and in-plane forces induced by the blades into the hub assembly 12.

Figure 5:
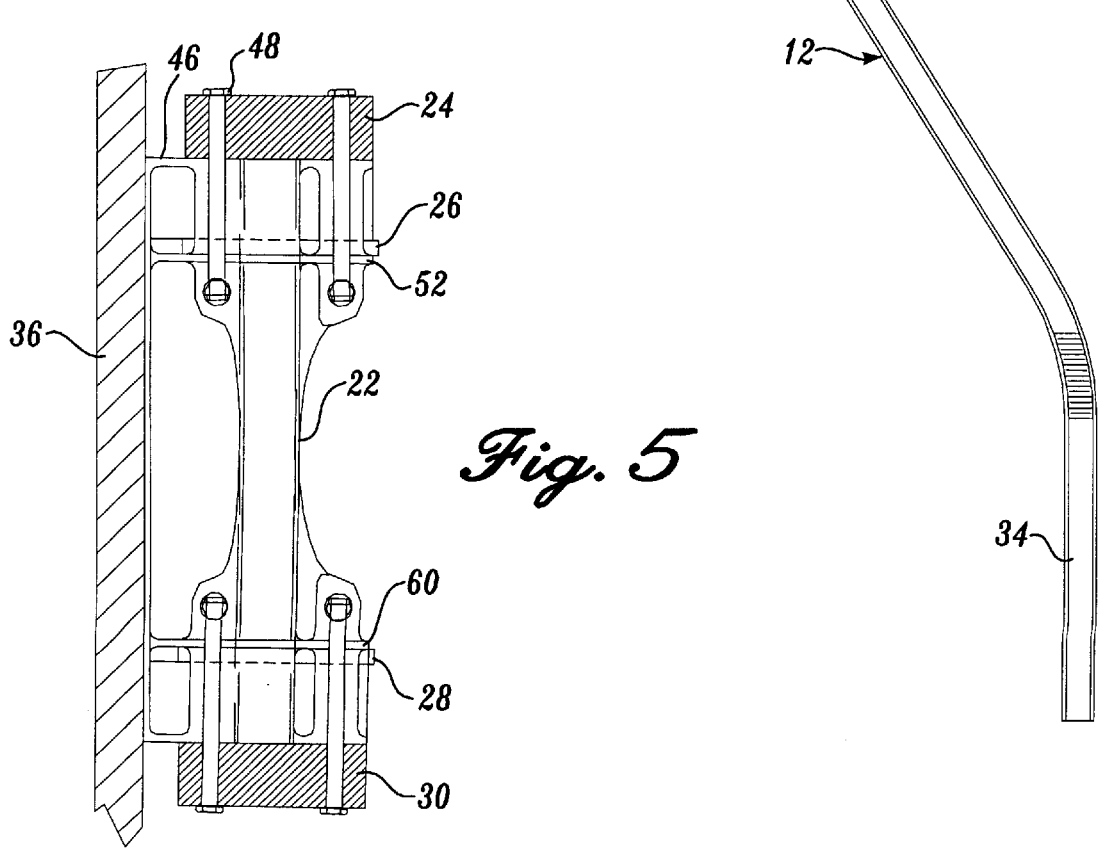
FIG. 5 is a partial cross sectional view taken along line 5—5 of FIG. 3.

As shown best in FIG. 5, the upper ring 24 is positioned on top of an upper surface 46 of the corner fittings 22 and attached to the fitting with upright fasteners 48 received within the corner fitting center rib 44. The segmented upper ring 26 (shown in phantom in FIG. 5) is positioned so that each representative segment nests between two corner fittings 22 (see the slot labeled 50 in FIG. 2) and rests on upon a flange 52 that extends laterally outward from the corner fitting 22.

Referring to FIG. 3, the segmented upper CF ring 26 is attached to the flange 52 by fasteners 54 that extend through holes 56 (shown in FIG. 2) located near each segmented ring end edge. The fasteners 54 are received within holes 58 in the corner fitting flange 52 (see FIG. 2). The lower CF ring 30 and the lower segmented CF ring 28 are connected to the corner fittings 22 in a similar manner (only upside down), with the lower CF ring 30 being fastened to a lower surface of the corner fittings 22 and portions of the segmented lower CF rings 28 being nested into the corner fittings 22 and bolted to a lower corner fitting flange 60 (see FIG. 5.)

Referring to FIG. 2, one inboard spherical bearing 32 is positioned at each hub shell spindle hole 42. Each bearing 32 includes a contoured inner race that fits against the inner curved surface of the hub shell. The bearing 32 is secure to the shell by fasteners (not shown.) Spherical bearings are well known in the art and as such are not described in detail herein. In preferred embodiments, the inboard spherical bearings are elastomeric bearings. In the arrangement of FIGS. 1–5, inboard edge portions of the bearings are fitted into bearing slots 62 (see FIG. 4) formed approximately mid-length along the upper and lower segmented CF rings 26, 28 directly above and below each inboard bearing, respectively.

Each inboard spherical bearing 32 provides lateral support for its respective rotor blade, while restricting the blade's inboard and outboard (centrifugal) movement during flight. The bearings 32 do permit rotational motion, however, to accommodate blade flapping as described below.

Referring to FIG. 2, each flexure mount assembly 16 includes a pair of opposed upper and lower flexures 64, 66 positioned above and below the each blade spindle. Two outboard bearing supports 98, 100, one for each flexure 64, 66, connect the flexure outboard ends to an outboard spherical bearing 72 through which the blade spindle extends. Four inboard flexure clamp plates 76, 78, 80, 82 connect the flexure inboard ends to the hub shell at the upper and lower shell openings. A flexure mount assembly is provided for each blade to control its flapping and lead/lag movement by controlling the blade spindle movement.

In more detail, as best illustrated in FIGS. 2 and 3, each flexure 64, 66 has a generally elongated planar quadrilateral shape with an inboard end 68 that is wider than an outboard end 70. Referring to FIG. 2, both the outboard end 70 and the inboard end 68 are thicker than the flexure middle regions in order to provide additional structure with which the flexures can be connected to an outboard spherical bearing 72 and the CF rings 24, 26, 28, 30, respectively. Further, each flexure inboard end 68 includes raised portions 74 formed on both the flexure's upper and lower surfaces. The raised portions 74 extend outward from the surface of the inboard end 68 and are used to secure the flexures 64, 66 between the inboard flexure clamp plates 76, 78, 80, 82 as described below. As shown, the raised portions are preferably convex or rounded in cross-section and are positioned generally transverse to the flexure's longitudinal direction.

The flexures 64, 66 are preferably constructed of a multiplicity of plies of graphite, fiberglass, composite, or the like. The flexures are tailored to provide a specific spring rate for flapping and lead-lag motions. In preferred stiff-in-plane embodiments, the flexures deflect a small amount in the flapping direction, but have high resistance to deflection in the lead/lag direction. By providing only a limited (controlled) amount of flapping motion, the flexures allow the blades to also incur a limited amount of flapping motion about their tilting attachment to the hub at the inboard spherical bearing 32. In one embodiment, the flexures are composite construction fabricated using automated ply-layup processes. The design of the flexure is a balance of attaining the proper stiffness and adequate strength.

Figure 4:
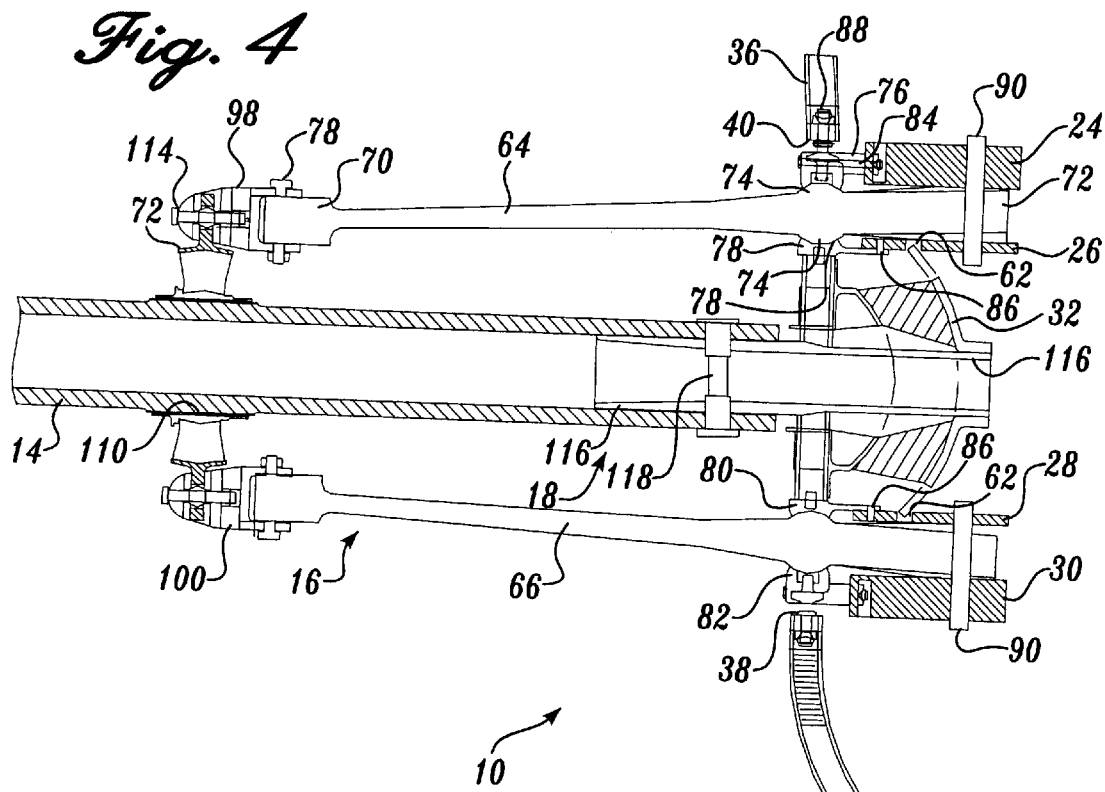
FIG. 4 is a partial cross sectional view taken along line 4—4 of FIG. 3.

Referring to FIG. 4, the flexures 64, 66 are coupled to the hub shell 12 via the four inboard flexure clamp plates 76, 78, 80, 82; the CF rings 24, 26, 28, 30; and the corner fittings 22 (shown in FIG. 3.) In particular, first and second clamp plates 76, 78 are provided above and below the upper flexure 64. Third and fourth clamp plates 80, 82 are provided above and below the lower flexure 66. The first clamp plate 76 is attached to the upper CF ring 24. The second clamp plate 78 is attached to the upper segmented CF ring 26. The third clamp plate 80 is attached to the lower segmented CF ring 28. The fourth clamp plate 82 is attached to the lower CF ring 30. Each clamp plate 76, 78, 80, 82 is connected to its respective CF ring 24, 26, 28, 30 along the ring's periphery, with the clamp plate extending radially outward therefrom.

Referring to the arrangement of FIG. 3 and to the upper flexure 64, the inner edge of the first clamp plate 76 is fastened (e.g., using bolts labeled 84) to the outer edge surface of the upper CF ring 24. The bolts 84 extend radially through the first clamp and into the outer edge surface of the upper CF ring 24. The second clamp plate 78 is positioned adjacent the lower surface of its respective upper segmented CF ring 26 and held with fasteners (e.g., pins 86 shown in FIG. 4). The fourth and third clamp plates 80, 82 are attached to the lower segmented CF ring 28 and the lower CF ring 30 in a similar manner.

Referring to FIG. 4, the raised portions 74 of the flexure inboard ends 68 are sandwiched between their respective clamp plates. Each clamp plate includes a concave mating surface for receiving its flexure raised portion. Adjusting bolts 88 are provided with stationary barrel nuts to allow tightening of each clamp plate toward its flexure raised portion 74. The adjusting bolts 88 are oriented vertically and are positioned within the hub shell upper portion 36 along the upper edge of each upper opening 40 and lower edge of each lower opening 38.

Referring to FIG. 2, the upper CF ring 24, the upper segmented CF ring 26, and the inboard end of the upper flexure 68 are all joined together by upright fasteners 90 (shown in FIGS. 3 and 4) that extend through holes 92 in the upper CF ring 24, through holes 94 in the upper flexure 64 and through holes 96 in the segments of the upper segmented CF ring 26. The lower CF ring 30, the lower segmented CF ring 28, and the lower flexure 66 are connected together in a similar manner. Each flexure inboard end 68 is additionally fastened to the CF rings using fasteners 92 (shown in FIG. 2.) The fasteners react to large lead-lag loads imposed on the flexures.

Referring to FIG. 2, each outboard bearing support 98, 100 includes opposed flanges 102, 104 extending laterally inward from a distal body 106. The upper flexure outboard end 70 inserts into the first outboard bearing support 98 between its opposed flanges. The lower flexure outboard end 70 inserts into the second outboard bearing support 100 between its opposed flanges. The flexure outboard ends are held therein via retaining bolts 78.

Referring to FIG. 4, the outboard spherical bearing 72 as shown includes an inner opening 110 oriented along the blade axis, through which the blade shaft 14 extends. Each outboard spherical bearing includes additional structure extending from its upper and lower circumferential edges. The bodies of the first and second outboard bearing supports 98, 100 are attached to the outboard spherical bearing 72 at these additional structures using fasteners 114. The arrangement of the outboard bearing supports 98, 100 and the outboard spherical bearings 72 allows the flexures 64, 66 to pivot up and down under aerodynamic forces. The location of the outboard bearing can be shifted along the blade axis to affect the in-plane and out-plane dynamic response (natural frequency response), but not stiffness per se.

The outboard spherical bearings 72 are preferably formed from an integral metal or composite bearing housing. Alternatively, the outboard spherical bearing may be formed of a radial metal, or a hybrid combination of metal using a Teflon-type liner and/or an elastomeric material. The material should permit the appropriate response characteristics, e.g., pitch change motion (torsional about the blade axis), reaction for flap and lead/lag forces, axial extension capability to compensate for the foreshortening of the flap flexures when defected. This bearing further preferably includes some spherical laminations or anti-fretting surfaces to accommodate bearing housing angular or cocking displacement.

Referring to FIG. 4, inboard blade shaft assemblies 18 connect the rotor blades to the hub 10. One inboard blade shaft assembly is provided for each flexure mount assembly and includes the blade shaft 14 located through and supported by the outboard spherical bearing 72. The blade shaft inboard end connects to one end of a spindle 116 in a conventional manner, such as by inserting a pin and bushing 118 therebetween. The spindle 116 extends inward and is retained in and supported by the inner races of a inboard spherical bearing 32 mounted in the hub structure. As an additional safely measure, redundant blade retaining components (not shown) may be provided.

Referring to FIG. 3, a pitch arm 120 extends outward from a portion of the blade shaft inboard end. Rotation of the pitch arm causes like rotation of the blade shaft and spindle (and hence the blade) about their shared longitudinal axis. During pitching motion, the blade shaft 14 rotates within the outboard spherical bearings 72, and the spindle 116 rotates within the inboard spherical bearings 32. Displacement of the pitch arm is control by actuation of a conventional pitch control system (not shown). The location of the arm permits the incorporation of a limited amount of Delta-3 (pitch-flap coupling), if desired, for improved rotor stability and gust alleviation. The amount of coupling is a function of the location of the pitch arm relative to the flap axis.

As will be appreciated from the above, the embodiment of a present invention rotor system illustrated in FIGS. 1–5 is a semi-articulated, stiff-in-plane rotor system (SASTIP). The rotor system allows a controlled amount of flapping motion and very little in-plane movement.

When flapping, the blade shaft 14 and the outboard spherical bearing 72 move jointly up and down. Vertical loads placed on the blades, the blade shafts, and the spindles are transferred to the hub shell 12 through both the inboard and outboard bearings. Vertical loads at the outboard bearings pass through the upper and lower flexures 64, 66, into the clamp plates 76, 78, 80, 82 and directly into the hub shell 12 at the upper and lower openings.

During flapping displacement, the stiffness of the upper and lower flexures 64, 66 determines the angle through which the outboard bearing and thus the blade will flap. Flapping is therefore controlled by structurally tailoring the upper and lower flexures 64, 66, the outboard spherical bearings 72, and the inboard spherical bearings 32 to result in the desired flapping frequency. The outboard spherical bearings 72 permit a small amount of inboard and outboard lateral displacement of the blade shaft 110 and spindle in order to accommodate the lateral component to the flapping angular displacement.

There is essentially no in-plane displacement of the hub flexures or the blades. During use, the upper and lower flexures 64, 66 are prevented from moving inboard and outboard with respect to the hub shell by the interaction between the flexures and the CF rings via the clamp plates. In addition, the bolts 90 and 92 extending through the CF rings and the flexures also prevent the flexures from moving inboard or outboard with the respect to the hub shell 12.

As will be appreciated from a reading of the above, the present invention prop rotor hub provides a low cost, reliable, and simple prop rotor hub which has very few parts, which utilizes efficient and long-life composite structures for the major structural entities, and is of minimum weight and high reliability. The rotor system provides controlled amounts of blade motion without using lead-lag or flapping hinges. The hub is suitable for use on single and tandem rotor helicopters, tilt rotor, and tilt wing aircraft. It will accommodate a multiplicity of rotor blades to tailor minimal acoustic signature and will maximize high speed rotor/wing stability.

While the preferred embodiment of the invention has been illustrated and described, it will be appreciated that various changes can be made therein without departing from the spirit and scope of the invention. For example, depending upon the design, the structural characteristics of the upper and lower flexures 64, 66 can be altered to produce a rigid, semi-articulated, soft-in-plane or semi-articulated version of the rotor system. The most desirable configuration from structural, dynamic, and high-speed stability considerations appears to be the semi-articulated, stiff-in-plane (SASTIP). In addition, although the embodiment shown uses five blades, various blade configurations and number of blades could be utilized. Depending on the loads present in a particular application, a single flexure may be used in lieu of upper and lower flexures. The present invention may also be used with foldable rotors. Other components as are known in rotor craft may be provided, e.g., a secondary centrifugal force load path metal fitting located internal to the spindle and attaching to the inboard retainer of the inboard spherical bearing.

The embodiments of the invention in which an exclusive property or privilege is claimed are defined as follows:

1. A prop rotor system for use with radially-extending blade shafts each having an inboard end, the rotor system comprising:

(a) a hub assembly including a hub shell having a number of flexure openings, a number of spindle openings, a number of annular lateral rings disposed within the shell and connected thereto, and a number of inboard spherical bearings, one inboard bearing being located within each spindle opening; the inboard spherical bearing being designed to support the blade shaft inboard end and react vertical, horizontal, torsional and centrifugal forces; and (b) a number of flexure mount assemblies, each including at least two fixtures each having an inboard end and an outboard end, each assembly further including an outboard spherical bearing connected to the flexure outboard end, the outboard spherical bearing being adapted to support the blade shaft;

wherein each flexure inboard end is positioned through a hub shell flexure opening and fastened to two annular rings; and wherein during rotary motion of the rotor system, flapping and lead/lag blade loads are transmitted to the hub shell through the inboard and outboard spherical bearings, the flexures, and the annular rings, and centrifugal blade loads through the inboard spherical bearings.

2. A rotor system formed according to claim 1, wherein the flexure assembly further includes a pair of clamp plates connected to the hub shell at locations above and below each flexure opening to provide a vertical moment reaction to the hub shell, the other component of the couple being reacted into the annular rings and thence into the corner fittings.

3. A rotor system formed according to claim 2, wherein the flexures include attachment portions and the first and second clamp plates include mating recesses that engage the attachment ridges.

4. A rotor system formed according to claim 2, wherein the clamp plates are circumferentially attached about the annular rings.

5. A rotor system formed according to claim 4, wherein the hub flexure openings include upper and lower edge surfaces and the pair of clamp plates is positioned within the hub shell flexure openings at these surfaces.

6. A rotor system formed according to claim 5, further comprising an adjusting mechanism at each clamp plate.

7. A rotor system formed according to claim 1, wherein the connection of the flexure to the outboard spherical bearing includes fastening the flexure outboard end to an outboard bearing support and rotatably connecting the support to the outboard spherical bearing.

8. A rotor system formed according to claim 1, wherein the connection of the annular rings to the hub shell includes attaching a number of corner fittings to the interior of the hub shell and connecting the rings and the flexures to the corner fittings.

9. A rotor system formed according to claim 1, wherein the annular rings include a non-segmented ring and a segmented ring, both rings being attached to the corner fittings in stacked relation.

10. A prop rotor system for use with radially-extending blade shafts each having an inboard end, the rotor system comprising:

(a) a hub assembly including a cylindrical hub shell having a number of upper flexure openings, a number of lower flexure openings, a number of spindle openings, four annular rings disposed within the hub shell and connected thereto, and a number of inboard spherical bearings, one inboard bearing being located within each spindle opening; each inboard spherical bearing being adapted to support a blade shaft inboard end; and (b) a number of flexure mount assemblies each including an upper flexure having an inboard end and an outboard end, a lower flexure having an inboard end and an outboard end, one pair of upper clamp plates connected to the hub shell at locations above and below an upper flexure opening, one pair of lower clamp plates connected to the hub shell at locations above and below a lower flexure opening; and an outboard spherical bearing movably connected to the upper and lower flexure outboard ends, the outboard spherical bearing being adapted to support a blade shaft therethrough;

wherein the annular rings are positioned laterally within the hub shell one on top of the other, the pair of upper clamp plates are attached circumferentially about the two highest rings, the pair of lower clamp plates are attached circumferentially about the two lowest rings; the upper flexure being positioned through a hub shell upper flexure opening, the lower flexure being positioned through a hub shell lower flexure opening, both flexures being clamped therein by the corresponding pair of clamp plates, and fastened between the corresponding two annular rings; and wherein during rotary motion of the rotor system, flapping, lead/lag, and centrifugal blade loads are transmitted to the hub shell through the inboard and outboard spherical bearings, the flexures, and the annular rings.

11. A rotor system formed according to claim 10, wherein the upper flexure openings include upper and lower edge surfaces and the pair of upper clamps is positioned within the hub shell at these surfaces; and the lower flexure openings include upper and lower edge surfaces and the pair of lower clamps is positioned within the hub shell at these surfaces.

12. A rotor system formed according to claim 11, further comprising an adjusting mechanism at each clamp plate.

13. A rotor system formed according to claim 10, wherein the upper and lower flexures include rounded attachment portions and the upper and lower clamp pairs include mating recesses that engage the rounded attachment portions.

14. A rotor system formed according to claim 10, wherein the connection of the flexure outboard ends to the outboard spherical bearing includes fastening each flexure outboard end to an outboard bearing support and rotatably connecting the support to the outboard spherical bearing.

15. A rotor system formed according to claim 10, wherein the connection of the annular rings to the hub shell includes attaching a number of corner fittings to the interior of the hub shell and connecting the rings and the flexures to the corner fittings.

16. A rotor system formed according to claim 15, wherein the annular rings include a non-segmented upper ring, a segmented upper ring, a segmented lower ring, and a non-segmented lower ring; the clamp rings being positioned laterally within the hub shell one below the other.

17. A method of connecting a number of radially-extending prop rotor blade shafts to a central hub, each shaft having an inboard end, the method comprising:

(a) providing a hub assembly including a hub shell having a number of flexure openings, a number of spindle openings, a number of annular rings disposed within the shell and connected thereto, and a number of inboard spherical bearings, one inboard bearing being located within each spindle opening;

(b) providing a number of flexure mount assemblies each including at least one flexure having an inboard end and an outboard end, each flexure mount assembly further including an outboard spherical bearing connected to the flexure outboard end;

(c) positioning each flexure inboard end through a hub shell flexure opening and fastening it to at least one annular ring; and (d) positioning each blade shaft inboard end in an inboard spherical bearing and radially extending the blade shaft through an outboard spherical bearing; and (e) allowing flapping, lead/lag, and centrifugal blade loads to be transmitted to the hub shell through the inboard and outboard spherical bearings, the flexures, and the annular rings during rotary motion of the rotor system.

18. A method of connecting rotor shafts according to claim 17, wherein the flexure assembly further includes a pair of clamp plates connected to the hub shell at locations above and below each flexure opening; and positioning each ere inboard end through a hub shell flexure opening includes clamping the flexure inboard ends therein.

19. A method of connecting rotor shafts according to claim 18, wherein camping the flexure inboard ends between a pair of clamp plates includes adjusting the amount of clamping force using mechanical fasteners.

20. A method of connecting rotor blade shafts according to claim 18, wherein clamping the flexure inboard ends includes using an outwardly-rounded attachment surface on the flexure inboard ends and using a pair of clamp plates having mating surfaces; the mating surfaces minimizing the point loads on the flexures.

21. A method of connecting rotor shafts according to claim 17, wherein movably connecting the upper and lower flexures inboard ends to the hub further includes attaching a number of corner fittings within the hub and attaching the flexure inboard ends to the annular rings and the corner fittings.

* * * * *

UNITED STATES PATENT AND TRADEMARK OFFICE
CERTIFICATE OF CORRECTION

PATENT NO. : 6,050,778
DATED : April 18, 2000
INVENTOR(S) : F.H. McArdle et al.

It is certified that error appears in the above-identified patent and that said Letters Patent is hereby corrected as shown below:

| COLUMN | LINE | ERROR |
|---|---|---|
| 11 (Claim 18, | 15 line 5) | "ere" should read --flexure-- |
| 11 (Claim 19, | 18 line 2) | "camping" should read --clamping-- |

Signed and Sealed this

Tenth Day of April, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO.    : 6,050,778
DATED         : April 18, 2000
INVENTOR(S)   : F.H. McArdle et al.

It is certified that error appears in the above-identified patent and that said Letters Patent is hereby corrected as shown below:

Column 8,
Line 65, "fixtures" should read -- flexures --

Signed and Sealed this

Twenty-first Day of January, 2003

JAMES E. ROGAN
*Director of the United States Patent and Trademark Office*